HARRIET GRAY,
Tea-Kettle.

No. 159,817.  Patented Feb. 16, 1875.

WITNESSES:
Anas. Nida
Alex F. Roberts

INVENTOR:
Harriet Gray
BY
ATTORNEYS.

UNITED STATES PATENT OFFICE.

HARRIET GRAY, OF MARQUETTE, MICHIGAN.

IMPROVEMENT IN TEA-KETTLES.

Specification forming part of Letters Patent No. 159,817, dated February 16, 1875; application filed September 12, 1874.

*To all whom it may concern:*

Figure 1:
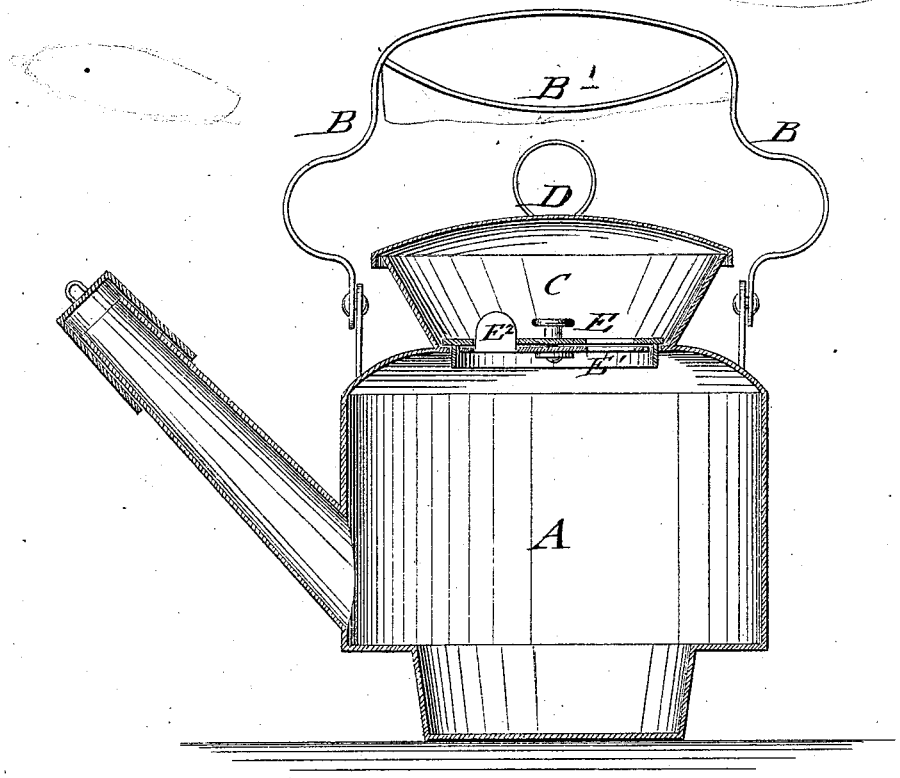
Figure 2:
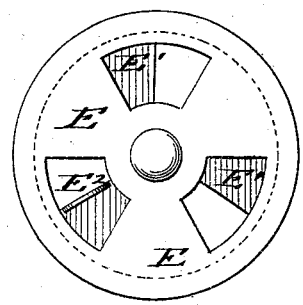

Be it known that I, HARRIET GRAY, of Marquette, in the county of Marquette and State of Michigan, have invented a new and Improved Tea-Kettle, of which the following is a specification:

In the accompanying drawing, Figure 1 represents a vertical longitudinal section of my improved tea-kettle; and Fig. 2, a detail top view of the inner perforated cover, with adjustable slide-piece.

Similar letters of reference indicate corresponding parts.

The object of my invention is to furnish for household purposes an improved tea-kettle, by which the spilling and boiling over of the water is prevented, and also the heat issuing at the top or cover part utilized for the purpose of keeping articles warm or cooking therewith.

My invention consists of a tea-kettle provided with a funnel-shaped top rim and outer cover, and also with an interior perforated cover, having an adjustable slide-plate, for opening or closing the steam-issuing perforations.

In the drawing, A represents a tea-kettle, of the usual size and shape, the handle part B of which is provided with a concaved shield, B', turned up at the edges, for protecting the hand against getting injured by the steam issuing from the kettle. The top part of kettle A is provided with a funnel-shaped rim, C, which is extended to suitable height around the opening of the same, for the purpose of facilitating the pouring in of water in an easy and rapid manner without spilling, and without the necessity of removing the kettle from the stove. The rim prevents, also, the water from boiling over onto the stove.

The space inside of the rim may be utilized for steaming, cooking, or warming various articles placed therein, and closed by an outer cover, D, applied to the rim, so that vessels of smaller size may be placed therein. Large vessels, however, as coffee or tea pots, plates or dishes containing meats or vegetables, are placed upon the rim after the outer cover is taken off, and warmed or cooked by the steam issuing from the kettle.

The top opening of the kettle is closed by an interior perforated cover, E, which has a centrally-applied slide-piece, $E^1$, and button $E^2$, for being partially or wholly opened and closed, admitting the filling of the kettle with water, and the application of steam to articles placed on the rim, without removing the cover itself from the kettle.

The usefulness of the tea-kettle is, by these simple and inexpensive improvements, greatly enhanced, and the hitherto escaping heat of the same utilized for various purposes.

Having thus described my invention, I claim as new and desire to secure by Letters Patent—

The combination, with a tea-kettle having a funnel-shaped top rim provided with a cover, of an interior perforated cover with adjustable slide-piece, all arranged substantially in the manner and for the purpose set forth.

HARRIET GRAY.

Witnesses:
JOSEPH H. PRIMEAU,
WILSON H. GRAY.